3,194,778
VINYLIDENE CHLORIDE POLYMER-DIOLEFIN, LOW ALKYL ALKACRYLATE COPOLYMER BLEND HAVING IMPROVED LOW TEMPERATURE PROPERTIES
George J. Butzler, George E. Sterling, and Robert E. Lee, Midland, Mich., assignors to The Dow Chemical Company, Midland, Mich., a corporation of Delaware
No Drawing. Filed June 13, 1962, Ser. No. 202,063
14 Claims. (Cl. 260—31.8)

This invention relates to polymeric compositions and, in particular, to polymeric compositions based on vinylidene chloride polymers and copolymers.

Polymers and copolymers of vinylidene chloride with such comonomers as acrylonitrile, vinyl chloride, and lower alkyl acrylates have found wide use as films for packaging of foodstuffs and other articles. Such films possess many useful properties, such as inertness, ability to be heat-sealed, transparency, shrinkability, and low water vapor transmission rates, which are desirable for packaging foodstuffs. However, prior vinylidene chloride polymer films suffered the disadvantage of becoming brittle and losing strength and other qualities at low temperatures. Prior art attempts to plasticize these copolymers have not generally been successful in overcoming those problems. The compatability of liquid plasticizers with vinylidene chloride polymers is restricted which limits low temperature flexibility. Such liquid plasticizers also have a tendency to bleed out of the composition which is undesirable for packaging of certain foods.

Accordingly, it is a principal object of this invention to provide polymeric compositions based on polymers of vinylidene chloride which compositions retain their flexibility and other properties at low temperatures, such as are encountered in refrigerated foodstuffs and frozen foodstuffs.

It is a further object of the invention to provide polymeric compositions which have an advantageously low melt viscosity which facilitates the fabrication of films by extrusion and the like.

It is a further object of this invention to provide polymeric compositions which are relatively impermeable to water vapor and other gases.

The polymeric composition of this invention comprises a blend of (I) from 70 to 95% by weight of the composition of a crystalline polymer consisting of (a) about 70 to 100% by weight of vinylidene chloride and (b) 0 to 30% by weight of at least one monoethylenically unsaturated comonomer and (II) from 5 to 30% by weight of the composition of a rubber-like copolymer consisting of (1) from 70 to 95% by weight of a conjugated diolefin and (2) 5 to 30% by weight of a lower alkyl alkacrylate.

The crystalline vinylidene chloride polymers usable in this invention are well known and may be prepared by interpolymerizing vinylidene chloride with known comonomers. Typical of the normally crystalline polymeric materials falling within the advantageous definition are the polymers and copolymers of at least 70% by weight of vinylidene chloride with the remainder composed of one or more other monoethylenically unsaturated comonomers exemplary of which are vinyl chloride, vinyl acetate, vinyl propionate, acrylonitrile, alkyl and aralkyl acrylates having alkyl and aralkyl groups of up to about 8 carbon atoms, acrylic acid, acrylamide, vinyl alkyl ethers, vinyl alkyl ketones, acrolein, allyl esters and ethers, butadiene and chloropropene. Known ternary compositions also may be employed advantageously. Representative of such polymers are those composed of at least 70% by weight of vinylidene chloride with the remainder made up of, for example, acrolein and vinyl chloride, acrylic acid and acrylonitrile, alkyl acrylates and alkyl methacrylates, acrylonitrile and butadiene, acrylonitrile and itaconic acid, acrylonitrile and vinyl acetate, vinyl propionate, or vinyl chloride, allyl esters or ethers and vinyl chloride, butadiene and vinyl acetate, vinyl propionate, or vinyl chloride and vinyl ethers and vinyl chloride. Quaternary polymers of similar monomeric composition will also be known.

The rubber-like copolymers which impart low temperature flexibility to the vinylidene chloride polymer are copolymers of (1) an open chain aliphatic conjugated diolefin having from 4 to about 9 carbon atoms, such as butadiene or isoprene, with (2) lower alkyl alkacrylates having from 1 to about 4 carbon atoms in the alkyl ester group and 1 to 2 carbon atoms in the alpha alkyl group including for example isopropyl methacrylate, butyl methacrylate, methyl ethacrylate, ethyl ethacrylate, and propyl ethacrylate. The contemplated copolymers are rubber-like elastomers. Such elastomers have a Mooney viscosity at 212° F. of 11 to 146 and preferably in the range of 30 to 70. The rubber-like copolymers are known and may be prepared by copolymerizing the monomers in aqueous emulsion, as for example, by the procedure as generally disclosed in U.S. Patent No. 2,462,354.

The polymeric blends of the invention may include plasticizers, such as dioctyl phthalate, dibutyl sebacate, and the like, in the range of about 2 to 10% by weight of the composition. The polymer blend may also include antioxidants, light stabilizers, and other additives known in the art which do not deleteriously affect the properties of the film.

The polymer blends of the invention are preferably prepared by mixing latexes of the vinylidene chloride polymers and of the rubber-like copolymer in the proper proportions, coagulating the latex blend with alum or other known coagulants and recovery of dried polymer as is known in the art. The polymer blends are preferably extruded in tube form, stretched and oriented by the bubble technique and slit to form films as is known in this art. The compositions are useful in other processes, such as molding, slot extrusion, and other thermal fabrication techniques, to form films, fibers, foils, molded articles, and other forms having the superior properties.

The products of this invention will be illustrated with the following examples in which all percentages and parts are by weight.

EXAMPLE 1

A latex containing 34% solids of crystalline copolymer composed of 73% by weight vinylidene chloride and 27% by weight of vinyl chloride was prepared by emulsion polymerization, utilizing potassium persulfate as the catalyst and the dihexyl ester of the sodium salt of sulfosuccinic acid as the emulsifier in a manner well known in the art.

A series of rubbery latexes were prepared composed of from between 70 and 100% by weight butadiene and correspondingly from between 0 and 30% by weight methyl methacrylate, having a solids content of about 45% by utilizing potassium persulfate as the catalyst and the dihexyl ester of the sodium salt of the sulfosuccinic acid as the emulsifier. To each latex there was added 1% based on the latex solids of 2,4-dimethyl-6-(1-methylcyclohexyl) phenol as an antioxidant.

Separate portions of the vinylidene chloride latex as described herein, were individually blended with each of the rubbery latexes in desired proportions, coagulated, and dried and the polymer blend recovered.

Unplasticized flow moldings were made from certain of the polymer blends.

Other samples of the polymer blends were formulated with 7% by weight of dibutyl sebacate as a plasticizer and 0.5% magnesium oxide. Each of the formulated polymer blends were subsequently individually thermally extruded using standard bubble techniques into oriented films having a thickness of 0.001 inch.

The following tables summarize the results of the physical properties of the moldings and the oriented films.

Table I illustrates the composition of the rubbery latex, the melt viscosity and the flexural modulus of unplasticized flow moldings of polymer blends, composed of 85% by weight of the vinylidene chloride copolymer described herein and 15% by weight of the rubbery copolymer. The flexural modulus is the temperature in degrees C. at which the unplasticized molding possesses a modulus of $2.5 \times 10^5$ lbs./in.$^2$ in flexure. The melt viscosity (poise) expresses the flowability of a plastic at 180° C. and 237 lbs./in.$^2$ pressure between parallel platens at essentially zero shear rates.

*Table I.—Moldings*

BLENDS OF 85% VINYLIDENE CHLORIDE COPOLYMER+ 15% OF THE COPOLYMER OF BUTADIENE-METHYL METHACRYLATE

| Sample No. | Rubber Latex Composition | | | Flexural Modulus, °C. |
|---|---|---|---|---|
| | Butadiene, Percent | Methyl Methacrylate, Percent | Melt Viscosity (poises×10³) | |
| For Comparison: | | | | |
| 1 | 100 | 0 | 160 | +11.5 |
| 2 | 0 | 0 | 180 | 8 |
| This Invention: | | | | |
| 3 | 95 | 5 | 270 | 0 |
| 4 | 90 | 10 | 278 | −4 |
| 5 | 86 | 14 | 284 | −3 |
| 6 | 84 | 16 | 270 | 5 |
| 7 | 82 | 18 | 225 | 0.5 |
| 8 | 80 | 20 | 254 | 2 |
| 9 | 78 | 22 | 210 | 2 |
| 10 | 76 | 24 | 252 | −1.5 |
| 11 | 74 | 26 | 182 | −1.5 |
| 12 | 70 | 30 | 173 | 0 |

The following Table II illustrates the composition of the rubbery latex and the cold flex properties of a series of plasticized oriented films as described herein. The cold-flex is the number of times the film may be bent over itself before such film ruptures.

*Table II.—Oriented films*

BLENDS OF 85% VINYLIDENE CHLORIDE COPOLYMER+ 15% OF THE COPOLYMER OF BUTADIENE-METHYL METHACRYLATE+7% DIBUTYL SEBACATE AT 0.5% MgO

| Sample No. | Rubber Latex Composition | | Cold Flex | |
|---|---|---|---|---|
| | Butadiene, Percent | Methyl Methacrylate, Percent | −18° C. | −40° C. |
| For Comparison: | | | | |
| 13 | 100 | 0 | 1 | <1 |
| This Invention: | | | | |
| 14 | 95 | 5 | 10+ | 10 |
| 15 | 90 | 10 | 10+ | 10+ |
| 16 | 86 | 14 | 10+ | 10+ |
| 17 | 84 | 16 | 10+ | 10+ |
| 18 | 82 | 18 | 10+ | 5 |
| 19 | 80 | 20 | 10+ | 10 |
| 20 | 78 | 22 | 10+ | 4 |
| 21 | 76 | 24 | 10+ | 5 |
| 22 | 74 | 26 | 10+ | 2 |
| 23 | 70 | 30 | 10+ | 2 |

Tables III, IV, and V present data on physical properties of plasticized oriented films composed of 73% vinylidene chloride—27% vinyl chloride modified with various percentages of a rubbery latex composed of a butadiene and methyl methacrylate copolymer.

*Table III.—Oriented films*

VINYLIDENE CHLORIDE COPOLYMER PLUS COPOLYMER OF 82% BUTADIENE-18% METHYL METHACRYLATE PLUS 7% DIBUTYL SEBACATE PLUS 0.5% MgO

| Sample No. | Butadiene-Methyl Methacrylate Copolymer, Percent | Melt Viscosity (poises×10³) | Cold Flex | |
|---|---|---|---|---|
| | | | −18° C. | −40° C. |
| 24 | 5 | 175 | 2 | 1 |
| 25 | 10 | 182 | 10+ | 3 |
| 26 | 12 | 190 | 10+ | 2 |
| 27 | 14 | 208 | 10+ | 4 |
| 28 | 16 | 215 | 10+ | 10+ |
| 29 | 18 | 298 | 10+ | 10+ |
| 30 | 20 | 300 | 10+ | 10+ |
| 31 | 25 | | 10+ | 10+ |

*Table IV.—Oriented films*

VINYLIDENE CHLORIDE COPOLYMER + COPOLYMER OF 80% BUTADIENE-20% METHYL METHACRYLATE + 7% DIBUTYL SEBACATE + 0.5% MgO

| Sample No. | Butadiene-Methyl Methacrylate Copolymer, Percent | Melt Viscosity (poises×10³) | Cold Flex | |
|---|---|---|---|---|
| | | | −18° C. | −40° C. |
| 32 | 5 | 185 | 1 | 2 |
| 33 | 10 | 200 | 10+ | 3 |
| 34 | 12 | 217 | 10+ | 4 |
| 35 | 14 | 276 | 10+ | 6 |
| 36 | 16 | 320 | 10+ | 8 |
| 37 | 18 | 375 | 10+ | 10 |
| 38 | 20 | 520 | 10+ | 10+ |
| 39 | 25 | 950 | 10+ | 10+ |

A comparison of the normal physical properties of the above modified vinylidene chloride copolymer with a similarly prepared unmodified vinylidene chloride copolymer indicated very little change regarding tensile strength, percent elongation, percent shrinkage, oxygen transmission, and drop impact as measured at 23° C.

*Table V.—Oriented films*

VINYLIDENE CHLORIDE COPOLYMER + COPOLYMER OF 78% BUTADIENE-22% METHYL METHACRYLATE + 7% DIBUTYL SEBACATE + 0.5% MgO

| Sample No. | Butadiene-Methyl Methacrylate Copolymer, Percent | Melt Viscosity (poises×10³) | Cold Flex | |
|---|---|---|---|---|
| | | | −18° C. | −40° C. |
| 40 | 5 | 160 | 1 | 1 |
| 41 | 10 | 178 | 10+ | 1 |
| 42 | 12 | 172 | 10+ | 2 |
| 43 | 14 | 188 | 10− | 3 |
| 44 | 16 | 215 | 10+ | 3 |
| 45 | 18 | 230 | 10+ | 5 |
| 46 | 20 | 385 | 10+ | 10 |
| 47 | 25 | 950 | 10+ | 10+ |

It has additionally been found for purposes of comparison that an oriented film composed of 73 percent vinylidene chloride-27 percent vinyl chloride plasticized with 5 percent dibutyl sebacate has a cold flex of 1 at −18° C. and a cold flex of <1 at −40° C.

From the data presented, it can be seen that the addition of the indicated amounts of the specified elastomeric polymers to the normally crystalline vinylidene chloride copolymers results in blends having appreciably enhanced physical properties, over the vinylidene chloride copolymers whether plasticized or unplasticized and whether stabilized or unstabilized. With regard to the latter, a composition was prepared by intimately blending 15% by weight of a copolymer of 80% butadiene and 20% methyl methacrylate with 85% of a copolymer of 73% vinylidene chloride and 27% vinyl chloride. This blend was fabricated by thermal extrusion without further plasticization or stabilization into an oriented film. The properties of this film showed about the same magnitude improvement over an unblended vinylidene chloride copolymer film as is evidenced in the foregoing examples.

Similar good results are obtained from any composition comprising (I) from 70 to 95% by weight of the composition of a normally crystalline polymer consisting of (a) about 70 to 100% by weight of vinylidene chloride and (b) 0 to 30% by weight of at least one monoethylenically unsaturated comonomer and (II) from 5 to 30% by weight of a composition of a rubber-like copolymer as described herein.

From all of the above data it can be seen that incorporation of the butadiene-methyl methacrylate copolymers into normally crystalline vinylidene chloride polymers produces most favorable films and other articles for low temperature utility while retaining the desirable physical characteristics of those vinylidene chloride polymers.

We claim:
1. A polymeric composition comprising a blend of (I) from 70 to 95% by weight of the composition of a normally crystalline polymer selected from the group consisting of polyvinylidene chloride and interpolymers of at least about 70% by weight of vinylidene chloride with up to about 30% by weight of at least one other monoethylenically unsaturated comonomer and (II) complementarily from 5 to 30% by weight of the composition of a rubber-like copolymer consisting of (1) from 70 to 95% by weight of open chain aliphatic conjugated diolefin having from 4 to about 9 carbon atoms and (2) 5 to 30% by weight of a lower alkyl alkacrylate having from 1 to about 4 carbon atoms in the alkyl ester group and 1 to 2 carbon atoms in the alpha alkyl group.

2. The composition as claimed in claim 1 wherein said normally crystalline polymer is a copolymer of vinylidene chloride and vinyl chloride.

3. The composition as claimed in claim 2 wherein said normally crystalline polymer is a copolymer of 73% by weight of vinylidene chloride and 27% by weight of vinyl chloride.

4. The composition as claimed in claim 1 wherein said rubber-like copolymer is a copolymer of butadiene and methyl methacrylate.

5. The composition as claimed in claim 1 containing from 2 to 10% by weight of the composition of a plasticizer for a crystalline vinylidene chloride polymer.

6. The composition as claimed in claim 5 wherein said plasticizer is dibutyl sebacate.

7. The composition as claimed in claim 1 wherein said composition contains an antioxidant.

8. The composition as claimed in claim 7 wherein said antioxidant is 2,4-dimethyl-6-(1-methylcyclohexyl) phenol.

9. A polymeric composition comprising a blend of (I) from 70 to 95% by weight of a composition of a normally crystalline polymer selected from the group consisting of polyvinylidene chloride and copolymers of at least about 70% by weight of vinylidene chloride with up to about 30% by weight of vinyl chloride and (II) from 5 to 30% by weight of the composition of a rubber-like copolymer consisting of (1) from 70 to 95% by weight of butadiene and (2) 5 to 30% by weight of methyl methacrylate.

10. The composition as claimed in claim 9 containing from 2 to 10% by weight of the composition of dibutyl sebacate.

11. An oriented film having improved flexibility at temperatures below 32° F. composed of a homogeneous blend of (I) from 70 to 95% by weight of the film of a normally crystalline polymer selected from the group consisting of polyvinylidene chloride and interpolymers of at least about 70% by weight of vinylidene chloride with up to about 30% by weight of at least one other monoethylenically unsaturated comonomer and (II) from 5 to 30% by weight of the film of a rubber-like copolymer consisting of (1) from 70 to 95% by weight of a conjugated diolefin and (2) 5 to 30% by weight of a lower alkyl alkacrylate having from 1 to about 4 carbon atoms in the alkyl ester group and 1 to 2 carbon atoms in the alpha alkyl group.

12. The oriented film claimed in claim 11 wherein said monoethylenically unsaturated comonomer is vinyl chloride.

13. A molded article composed of a homogeneous blend of (I) from 70 to 95% by weight of the article of a normally crystalline polymer selected from the group consisting of polyvinylidene chloride and interpolymers of at least about 70% by weight of vinylidene chloride with up to about 30% by weight of at least one other monoethylenically unsaturated comonomer and (II) from 5 to 30% by weight of the article of a rubber-like copolymer consisting of (1) from 70 to 95% by weight of a conjugated diolefin and (2) 5 to 30% by weight of a lower alkyl acrylate, having from 1 to about 4 carbon atoms in the alkyl ester group and 1 to 2 carbon atoms in the alpha alkyl group.

14. A molded article claimed in claim 13 wherein said monoethylenically unsaturated comonomer is vinyl chloride.

References Cited by the Examiner

UNITED STATES PATENTS

| | | | |
|---|---|---|---|
| 2,469,721 | 5/49 | Gidley | 260—45.5 |
| 3,033,812 | 5/62 | Isaacs et al. | 260—31.8 |

FOREIGN PATENTS 644,005  7/62  Canada.

OTHER REFERENCES

A New Dictionary of Chemistry, by Miall, Interscience Publishers Inc., New York, page 48, 1961.

Plasticizers, by Buttrey, Franklin Publishing Co., New Jersey, Chapter 4, page 76, 1960.

MORRIS LIEBMAN, *Primary Examiner.*